April 20, 1965 B. GARLAND ETAL 3,179,900

ELECTRIC OSCILLATOR ARRANGEMENTS WHICH SUPPLY OUTPUT SIGNALS WITH STABILIZED VOLTAGE

Filed June 15, 1962 2 Sheets-Sheet 1

INVENTORS
BERNARD GARLAND
HANS KARL PFYFFER
BY Kirschstein, Kirschstein & Ottinger
ATTORNEYS April 20, 1965 B. GARLAND ETAL 3,179,900

ELECTRIC OSCILLATOR ARRANGEMENTS WHICH SUPPLY OUTPUT SIGNALS WITH STABILIZED VOLTAGE

Filed June 15, 1962 2 Sheets-Sheet 2

INVENTORS
BERNARD GARLAND
HANS KARL PFYFFER
BY Kinderlen, Kinderlen & Ottege
ATTORNEYS 3,179,900
Patented Apr. 20, 1965

3,179,900

ELECTRIC OSCILLATOR ARRANGEMENTS WHICH SUPPLY OUTPUT SIGNALS WITH STABILIZED VOLTAGE

Bernard Garland and Hans Karl Pfyffer, Coventry, England, assignors to The General Electric Company Limited, London, England Filed June 15, 1962, Ser. No. 202,920
Claims priority, application Great Britain, June 16, 1961, 21,883
3 Claims. (Cl. 331—109)

This invention relates to electric oscillator arrangements.

According to the present invention, an electric oscillator arrangement includes an oscillator circuit which is arranged to generate an oscillatory signal which is supplied to the output of the arrangement, means to supply a portion of the oscillatory signal appearing at the output of the arrangement to a comparator circuit which supplies an oscillatory error signal in dependence upon the difference between the peak amplitude of the oscillatory signal appearing at the output of the arrangement and a direct current reference voltage of stabilised value, and means to supply a control signal to the oscillator circuit in dependence upon the value of the error signal whereby the oscillatory signal appearing at the output of the arrangement is controlled to have a required amplitude.

Preferably said comparator circuit comprises first and second transistors, each having a control electrode and two further electrodes, similar further electrodes of the transistors being connected by way of separate resistances to a first point, and the other similar further electrodes of the transistors being connected by way of a common resistance to a second point, and supply means arranged to maintain said points at suitable potentials whereby, during operation, when said portion of the oscillatory signal appearing at the output of the arrangement is supplied to the control electrode of the first transistor and said reference voltage is supplied to the control electrode of the second transistor, said error signal appears at the output electrode of the first transistor.

An electric oscillator arrangement in accordance with the present invention will now be described by way of example with reference to the accompanying drawings.

The circuit is too large to show on a single sheet, so:

The arrangement to be described is for use in generating a pilot signal for use in a communication system of the kind in which a pilot signal is transmitted for the purpose of giving an indication of the transmission characteristics of a path between a transmitter and a receiver. As the indication is given in dependence upon the amplitude of the pilot signal as received at the receiver, it is necessary that the amplitude of the transmitted pilot signal be maintained substantially constant, in order that variations in the amplitude of the received pilot signal are known to be due solely to variations in the transmission characteristics of the path. The arrangement now to be described is such as to supply a pilot signal of substantially constant amplitude.

Figures 1, 3:
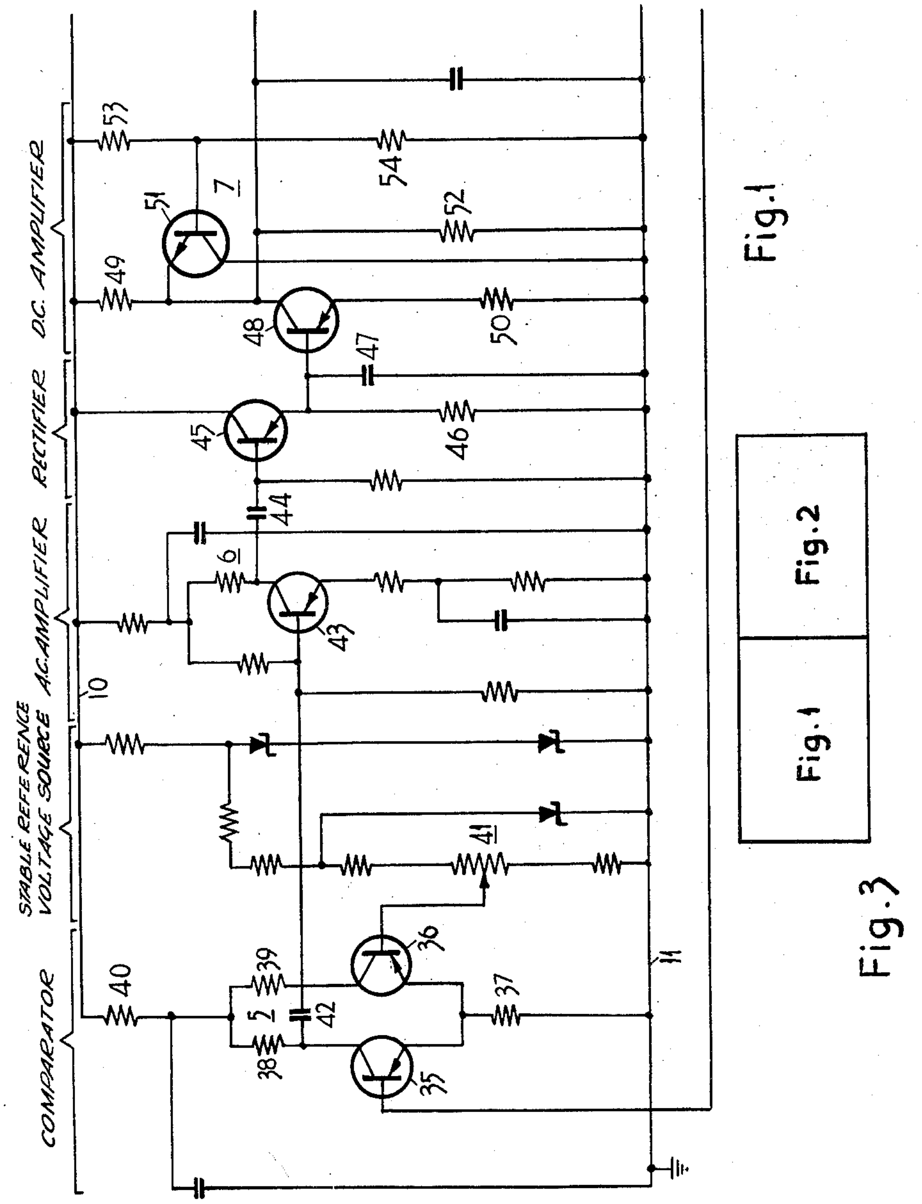
FIGURE 1 shows a part of the circuit.
FIGURE 3 shows the way to assemble FIGURES 1 and 2 to make the complete circuit.
Figure 2:
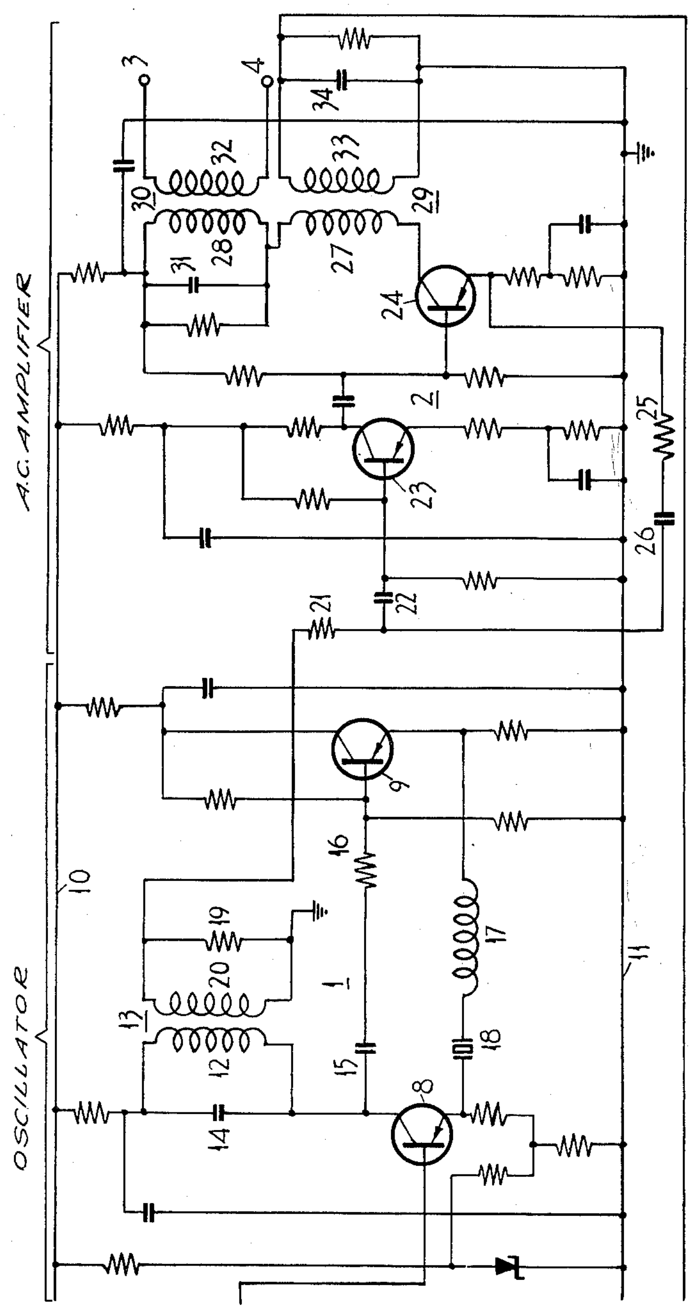
FIGURE 2 shows the remainder of the circuit.

Referring to FIGURES 1 and 2 of the drawings, the oscillator arrangement comprises the basic oscillator circuit 1 which, during operation, generates an oscillatory signal which is supplied by way of an alternating current amplifier 2 to output terminals 3 and 4 of the arrangement, the amplified output signal being used as the pilot signal.

A portion of the output signal is also supplied to a feedback path which includes a comparator circuit 5 which operates to compare the peak amplitude of the output signal with a direct current reference voltage and to supply an oscillatory error signal in dependence upon this difference. This oscillatory error signal is then amplified in an alternating current amplifier 6, rectified, amplified in a direct current amplifier 7, and supplied to the oscillator circuit 1 as a direct current control voltage so as to control the amplitude of the oscillatory signal supplied thereby to have a required value.

Considering the oscillator arrangement in more detail, the oscillator circuit 1 comprises two p-n-p junction transistors 8 and 9, each having base, collector and emitter electrodes, the transistor 8 operating in the common base and the transistor 9 in the common collector mode. Operating potentials for the oscillator circuit 1, as for the remainder of the arrangement, are derived from a negative supply line 10 and an earth line 11. The transistor 8 has a collector load formed by the primary winding 12 of a transformer 13, the winding 12 being connected between the collector electrode of the transistor 8 and the supply line 10. The winding 12 is tuned to the desired frequency of oscillation by a capacitor 14 connected in parallel with it.

To sustain oscillation positive feedback is provided by coupling the collector electrode of the transistor 8 by way of a capacitor 15 and a resistor 16 in series to the base electrode of the transistor 9. The emitter electrode of the transistor 9 is connected to the emitter electrode of the transistor 8 by way of an inductor 17 and a series resonant crystal 18 in series.

The required oscillatory signal appears in operation across a resistor 19 which is connected in parallel with the secondary winding 20 of the transformer 13, this oscillatory signal being supplied by way of a resistor 21 and capacitor 22 in series to the amplifier 2.

The amplifier 2 includes two p-n-p junction transistors 23 and 24, each having base, collector and emitter electrodes, the transistors 23 and 24 both operating in the common emitter mode. The emitter electrode of the transistor 24 is connected by way of a resistor 25 and a capacitor 26 in series to the junction of the resistor 21 and capacitor 22, so as to provide negative feedback to maintain the gain of the amplifier 2 substantially constant.

The collector electrode of the transistor 24 is connected to the supply line 10 by way of the series-connected primary windings 27 and 28 of transformers 29 and 30, respectively. The winding 28 is tuned to the desired frequency of oscillation by a capacitor 31 connected in parallel with it. The required amplified output signal, which is used as the pilot signal, appears across the secondary winding 32 of the transformer 30 and is supplied to the terminals 3 and 4.

The secondary winding 33 of the transformer 29 is tuned to the desired frequency of oscillation by a capacitor 34 connected in parallel with it, and a signal derived from the winding 33 is supplied back to the comparator circuit 5.

The comparator circuit 5 comprises two p-n-p junction transistors 35 and 36, each having base, collector and emitter electrodes, the emitter electrodes of both the transistors 35 and 36 being connected to the earth line 11 by way of a common resistor 37. The collector electrodes of the transistors 35 and 36 are connected by way of equal resistors 38 and 39 to a point which is connected by way of a further resistor 40 to the supply line 10. A bias of constant value is applied to the base electrode of the transistor 36, this bias being derived from the supply line 10 by an arrangement 41 comprising resistors and Zener diodes, the arrangement 41 operating to provide the required direct current reference voltage, and to maintain it stable despite variations in temperature and in the potential of the supply line 10. The signal derived from the winding 33 of the transformer 29 provides a bias for the base electrode of the transistor 35.

The comparator circuit 5 operates to compare the peak amplitude of the oscillatory output signal, as represented by the bias applied to the base electrode of the transistor 35, with the reference voltage applied to the base electrode of the transistor 36. This comparison results in the production of an oscillatory error signal, the voltage of which is the algebraic sum of the bias applied to the base electrode of the transistor 35 and the reference voltage applied to the base electrode of the transistor 36.

This error signal is supplied by way of a capacitor 42 to the amplifier 6. The amplifier 6 comprises a p-n-p junction transistor 43, having base, collector and emitter electrodes, operating in the common emitter mode.

The amplified output signal supplied by the amplifier 6 is passed by way of a capacitor 44 to an infinite impedance detector which comprises a p-n-p junction transistor 45, having base, collector and emitter electrodes. The emitter electrode of the transistor 45 is connected to the earth line 11 by way of a resistor 46, so that, during operation a rectified voltage appears across the resistor 46. This rectified voltage is smoothed, by means of a capacitor 47 connected between the emitter electrode of the transistor 45 and the earth line 11, and is then supplied to the amplifier 7.

The amplifier 7 comprises a p-n-p junction transistor 48, having base, collector and emitter electrodes, the collector and emitter electrodes being connected by way of resistors 49 and 50 to the negative supply line 10 and the earth line 11, respectively. The amplifier 7 also includes an n-p-n junction transistor 51, having base collector and emitter electrodes, the emitter electrode of the transistor 51 being connected to the collector electrode of the transistor 48, and to the earth line 11 by way of a resistor 52. The collector electrode of the transistor 51 is connected to the earth line 11, and the base electrode of the transistor 51 is connected to a point on a potentiometer comprising resistors 53 and 54 connected in series between the supply line 10 and the earth line 11. The collector electrode of the transistor 48 is also connected to the base electrode of the transistor 8.

The operation of the oscillator arrangement is then as follows. Assuming the oscillator circuit 1 is supplying an oscillatory signal to the amplifier 2, the required pilot signal may be derived from the terminals 3 and 4, and a bias the value of which is dependent upon the peak amplitude of the pilot signal is applied to the base electrode of the transistor 35 in the comparator circuit 5. If the amplitude of the pilot signal increases, the oscillatory error signal supplied by the comparator circuit 5 varies in such a way that the signal supplied by the amplifier 7 to the base electrode of the transistor 8 in the oscillator circuit 1 becomes less negative with respect to the potential at the emitter electrode of the transistor 8, so tending to decrease the amplitude of the oscillatory signal supplied by the oscillator circuit 1, and therefore the amplitude of the pilot signal. Conversely, if the amplitude of the pilot signal decreases, the signal supplied by the amplifier 7 to the base electrode of the transistor 8 becomes more negative with respect to the emitter electrode of the transistor 8, so tending to increase the amplitude of the oscillatory signal supplied by the oscillator circuit 1, and therefore the amplitude of the pilot signal.

The purpose of the transistor 51 in the amplifier 7 is to prevent the potential at the collector electrode of the transistor 48, and hence the potential at the base electrode of the transistor 8, from going more negative than a predetermined value, so that the transistor 8 is not bottomed when the oscillator arrangement is first switched on. This is necessary in order that the oscillator arrangement may start satisfactorily.

In a particular arrangement of the oscillator arrangement described, it is desired that the potential at the base electrode of the transistor 8 should not become more negative than minus three volts, and to bring this about the bias for the base electrode of the transistor 51 is selected in a manner which will be apparent from the following consideration.

In general, the transistor 51 will be conducting when the potential at its base electrode is positive with respect to the potential at its emitter electrode. When the potential at the base electrode is more negative than that of the emitter electrode, the transistor 51 will be cut-off, and the impedance looking into its emitter electrode will be large.

When the oscillator arrangement is first switched on, the transistor 48 has no potential at its base electrode, and it is therefore cut-off. But for the transistor 51 there would, at this moment, be a large negative potential at the collector electrode of the transistor 48, which potential would be applied to the base electrode of the transistor 8 and would prevent the oscillator arrangement from starting. However, since the base electrode of the transistor 51 is held at a substantially fixed potential, it will conduct heavily as soon as the potential at its emitter electrode becomes more negative than the potential at its base electrode. This prevents the potential at the collector electrode of the transistor 48, and hence the potential at the base electrode of the transistor 8, from becoming more negative than the value fixed by the potential at the base electrode of the transistor 51. As the base current of the transistor 51 is small, the potential at its base electrode will be substantially independent of the base current and will therefore, be determined principally by the relative resistances of the resistors 53 and 54.

When the oscillator arrangement starts the transistor 48 will conduct, and the potential at its collector electrode will therefore assume a value which causes the transistor 51 to be cut-off, so that it then has no further effect on the operation.

We claim:

1. An electric oscillator arrangement comprising an oscillator, voltage reference means to supply a stable direct current reference voltage signal, feedback means connected to said oscillator to derive therefrom an oscillatory signal having a voltage proportional to the voltage of the oscillatory signal supplied by said oscillator, a differencing circuit which is connected to said feedback means and to said voltage reference means and which supplies an oscillatory error signal the instantaneous voltage of which is dependent upon the difference between the voltage of said reference voltage signal and the instantaneous voltage of the oscillatory signal supplied by said feedback means, rectifier means connected to said differencing circuit to derive therefrom a unidirectional error signal by rectifying said oscillatory error signal, and circuit means connecting said rectifier means to said oscillator whereby said unidirectional error signal is supplied to said oscillator to control the voltage of the oscillatory signal supplied thereby.

2. An electric oscillator arrangement according to claim 1 wherein the differencing circuit comprises first and second transistors each having a control electrode and first and second further electrodes, a first point, first and second resistive elements connected respectively between said first point and the first further electrode of each of said transistors, a second point, a third resistive element connected between said second point and the second further electrode of each of said transistors, supply means connected between said first and second points whereby a potential difference is maintained between them, circuit means connecting the control electrode of said first transistor and said feedback means whereby said oscillatory signal having a voltage proportional to the voltage of the oscillatory signal supplied by said oscillator is supplied to the control electrode of said first transistor, circuit means connecting the control electrode of said second transistor and said voltage reference means whereby said direct current reference voltage is supplied to the control electrode of said second transistor, and circuit means connecting the first further electrode of said first transistor and said rectifying means whereby said oscillatory error signal is supplied to said rectifying means.

3. An electric oscillator arrangement according to claim 2 wherein the first and second transistors are junction transistors, each having a base, a collector, and an emitter electrode.

References Cited by the Examiner

UNITED STATES PATENTS 3,084,294 4/63 Vallese -------------- 331—109

ROY LAKE, *Primary Examiner*.

JOHN KOMINSKI, *Examiner*.